United States Patent
Paradise

(10) Patent No.: US 7,600,417 B2
(45) Date of Patent: Oct. 13, 2009

(54) ULTRASONIC-DENSIOMETER MASS FLOW SENSOR FOR USE IN FLOW METERING UNITS

(75) Inventor: Bruce Paradise, Avon, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 275 days.

(21) Appl. No.: 11/304,273

(22) Filed: Dec. 15, 2005

(65) Prior Publication Data

US 2007/0151333 A1 Jul. 5, 2007

(51) Int. Cl.
*G01M 15/04* (2006.01)
(52) U.S. Cl. .................................................. 73/114.42
(58) Field of Classification Search .............. 73/114.38, 73/114.42, 114.43, 114.45, 114.48, 114.51
See application file for complete search history.

(56) References Cited

U.S. PATENT DOCUMENTS

| | | | | |
|---|---|---|---|---|
| 3,739,635 | A | | 6/1973 | Stuart |
| 3,772,915 | A | * | 11/1973 | Stamler ................... 73/861.03 |
| 4,193,291 | A | * | 3/1980 | Lynnworth ................ 73/32 A |
| 4,450,820 | A | * | 5/1984 | Haynes ....................... 123/514 |
| 4,508,127 | A | * | 4/1985 | Thurston ......................... 137/8 |
| 5,284,120 | A | | 2/1994 | Fukushima et al. |
| 6,912,918 | B1 | * | 7/2005 | Lynnworth et al. ....... 73/861.26 |
| 2002/0194902 | A1 | * | 12/2002 | Gehner et al. .............. 73/118.1 |
| 2003/0183206 | A1 | * | 10/2003 | Fujimoto et al. ............ 123/520 |
| 2004/0163459 | A1 | * | 8/2004 | Christian et al. ............. 73/199 |
| 2004/0211263 | A1 | * | 10/2004 | Wiesinger et al. ............ 73/716 |
| 2005/0049777 | A1 | * | 3/2005 | Fritsch et al. ............... 701/104 |

FOREIGN PATENT DOCUMENTS

| | | |
|---|---|---|
| AT | 006 303 U2 | 7/2005 |
| EP | 0 122 100 | 10/1984 |
| EP | 1 411 328 | 4/2004 |

OTHER PUBLICATIONS

European Search Report fo EP Application No. 06256314.3, May 20, 2008.

* cited by examiner

*Primary Examiner*—Eric S McCall
(74) *Attorney, Agent, or Firm*—Carlson, Gaskey & Olds

(57) ABSTRACT

A fuel delivery system uses a volumetric flow sensor and a densiometer to measure a mass flow rate of the fuel. A densiometer may be a coriolis mass flow sensor etched into a small circuit chip. As fuel flows past the densiometer a density of the fuel and characteristic slope as a function of temperature is determined. At least one temperature sensor is also located on the circuit chip to provide accurate temperature of the fuel to correspond to the fuel density reading. Piezoelectric crystals in the volumetric flow sensor generate and receive a sound wave. By analyzing the sound wave signals the volumetric flow rate of fluid through the volumetric flow sensor can be calculated. At least one temperature sensor is also placed on the volumetric flow sensor to correct for any thermal expansion of an inner diameter of the volumetric flow sensor and for final mass flow calculation. The density and temperature information from the densiometer and the volumetric flow and temperature information from the volumetric flow sensor are used to determine the density of the fuel at the volumetric flow sensor. By using the density calculated at the volumetric flow sensor and using the volumetric flow information an accurate mass flow rate of the fuel at the volumetric flow sensor can be calculated.

4 Claims, 3 Drawing Sheets

ULTRASONIC-DENSIOMETER MASS FLOW SENSOR FOR USE IN FLOW METERING UNITS

BACKGROUND OF THE INVENTION

This invention relates to a pressure regulating fuel delivery system suitable for a gas turbine engine, having a pressure regulator, together with an ultrasonic sensor and a densiometer to accurately measure the mass flow of fuel to the engine.

Conventional fuel delivery systems for gas turbine engines are expensive and include numerous complex parts. A typical fuel delivery system is controlled by scheduling fuel flow based upon a fuel metering valve position and a linear variable displacement transducer to provide feedback. The metering valve position is adjusted in closed loop to maintain the desired engine speed (and power setting). A low accuracy dual rotor turbine meter to measure totalized mass flow after the fuel metering unit. The totalized flow is used as a double check for the wing tank fuel level gauges. The dual rotor turbine meter is a volumetric device with limited accuracy, therefore it is not used for engine health monitoring.

The fuel metering valve, dual rotor turbine meter, linear variable displacement transducer, pressure regulator, and other components, are all quite complicated. The metering valve also creates a pressure drop within the system that generates extra heat in fuel and decreases the efficiency of the oil cooling system. Therefore, what is needed is a system that reduces heat load, eliminates the fuel metering valve, dual rotor turbine meter, and linear variable displacement transducer, and accurately measures the instantaneous and totalized mass flow to the burner, for engine health monitoring.

SUMMARY OF THE INVENTION

A pressure setting fuel delivery system uses an ultrasonic volumetric flow sensor and a densiometer to measure a mass flow rate of the fuel.

A densiometer having a coriolis mass flow sensor etched into a small chip is located within the fuel delivery system. Preferably, for durability reasons, the densiometer is at a location having lower fuel temperatures and pressures. As fuel flows past the densiometer a density of the fuel is determined for a given temperature and a slope verses temperature determined and continuously updated. At least one temperature sensor is also located on the chip to provide accurate temperature of the fuel to correspond to the fuel density reading.

An ultrasonic flow sensor is positioned in the system such that fuel flows through the ultrasonic flow sensor and is discharged from fuel nozzles into the engine. Piezoelectric crystals within the ultrasonic flow sensor generate and receive a sound wave. By analyzing the sound wave signals the fluid velocity and a corresponding volumetric flow rate of fluid through the ultrasonic flow sensor can be calculated. At least one temperature sensor is also placed on the ultrasonic flow sensor to correct for any thermal expansion of an inner diameter of the ultrasonic flow sensor when analyzing the sound wave signals, and for converting the volumetric flow to mass flow.

The density and temperature information from the densiometer and the volumetric flow rate and temperature from the ultrasonic flow sensor are sent to an electronic engine controller (EEC). Using the information the EEC can determine the density of the fuel at the ultrasonic flow sensor and thus the true mass flow rate of the fuel. The EEC can then send this information to aircraft systems that monitor total and instantaneous fuel consumption for engine health monitoring.

Accordingly, the present invention provides a fuel metering unit that eliminates the fuel metering valve, dual rotor turbine meter, linear variables displacement transducer, and other complicated and expensive components typically found in prior art fuel delivery systems, while providing accurate mass flow rate information.

These and other features of the present invention can be best understood from the following specification and drawings, the following of which is a brief description.

DETAILED DESCRIPTION OF THE PREFERRED EMBODIMENT

Figure 1:
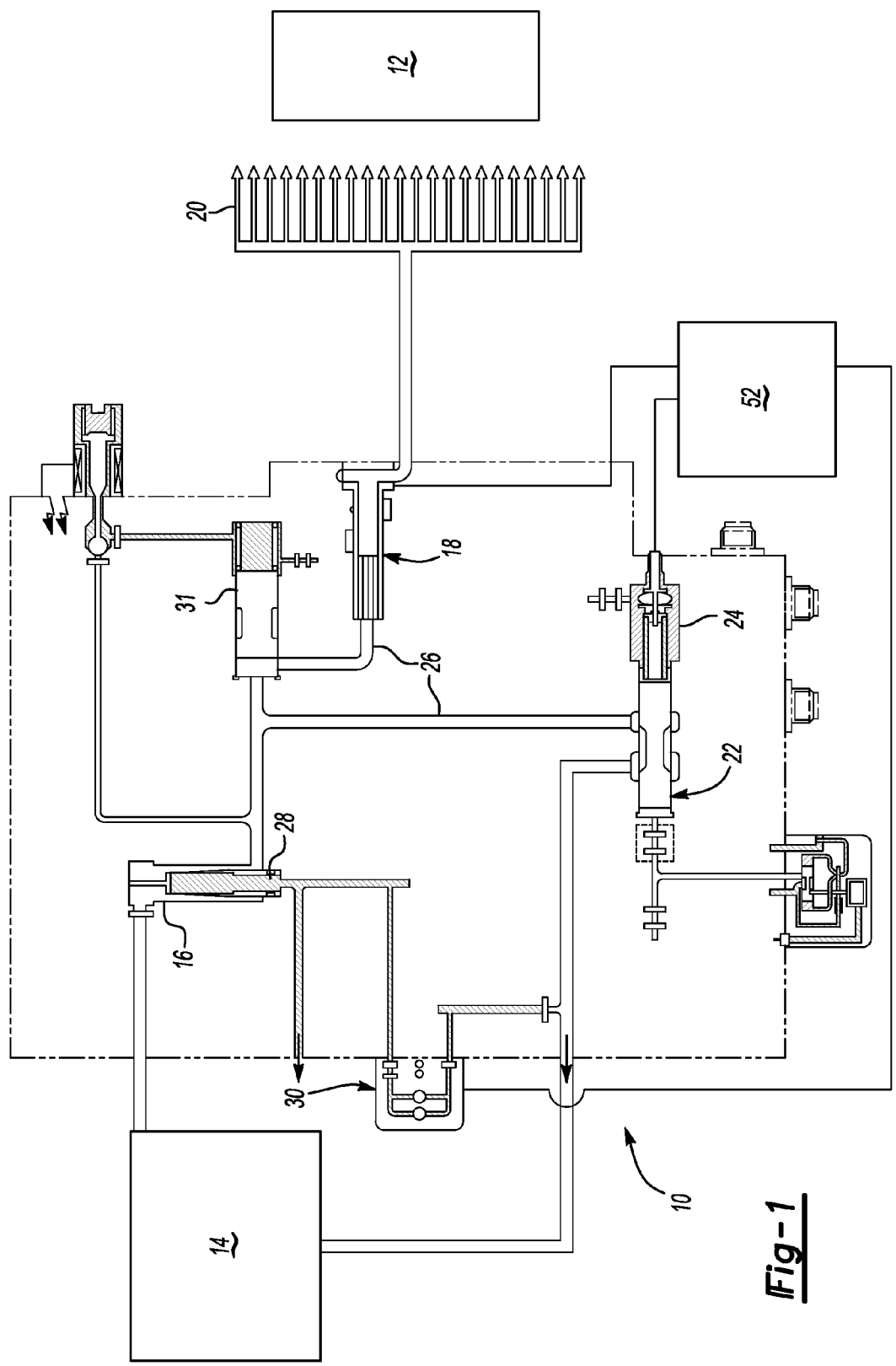
FIG. 1 is a schematic view of a fuel delivery system for a gas driven engine.

A fuel delivery system 10 is shown schematically in FIG. 1. The system 10 is preferably for use in delivering fuel to a gas turbine engine 12. Fuel from a boost pump system 14 passes through a fuel filter 16. The fuel flows from the fuel filter 16 through an ultrasonic volumetric flow sensor 18 and is discharged from fuel nozzles 20 into the engine 12. Due to the ability of the ultrasonic flow sensor 18 to withstand high temperatures, it may be located immediately prior to the fuel nozzles 20 as shown in the present embodiment. However, other locations for the ultrasonic flow sensor 18 can also be utilized to provide volumetric flow information.

Between the fuel filter 16 and the ultrasonic flow sensor 18 a portion of the fuel is directed toward a pressure-regulating valve 24 which can be used to adjust the fuel pressure in the fuel line 26 prior to the fuel nozzles 20. By decreasing pressure within the fuel line 26 the flow rate of the fluid through the ultrasonic flow sensor 18 and out of fuel nozzles 20 is decreased. Inversely, as the pressure in the fuel line 26 is increased, the flow rate of the fuel through the ultrasonic flow sensor 18 and the fuel nozzles 20 is increased. Thus, the pressure regulating valve 24 is used to adjust the mass flow rate of the fuel into the engine 12.

Excess fuel is bypassed by the pressure regulating valve 24 and flows back to the boost pump system 14 where it later cycles through the system again. Additionally, a portion of the fuel that passes through the fuel filter 16 also passes through a fine filter 28. Fuel from the fine filter 28 flow through coriolis densiometer 30 then joins the fuel from the pump 22 to cycle back to the boost pump system 14. A Minimum Pressure and Shut-Off Valve (MPSOV) 31 is located between filter 16 and ultrasonic flow sensor 18. The MPSOV 31 opens as pressure builds and allows flow to the engine. It also is controlled by a separate solenoid (not shown) to allow shutting off the fuel flow and stopping the engine 12.

Figure 2:
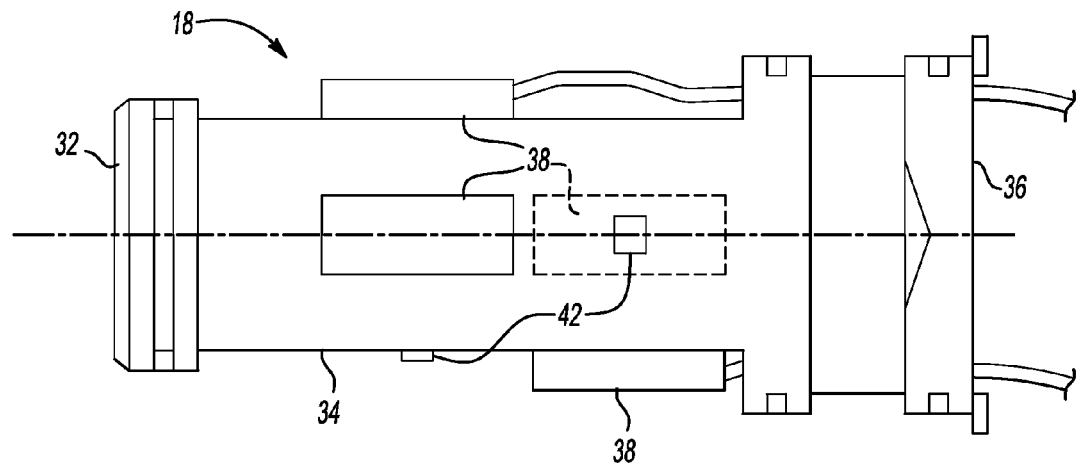
FIG. 2 is a side view of an ultrasonic sensor for measuring flow volume.
Figure 3:
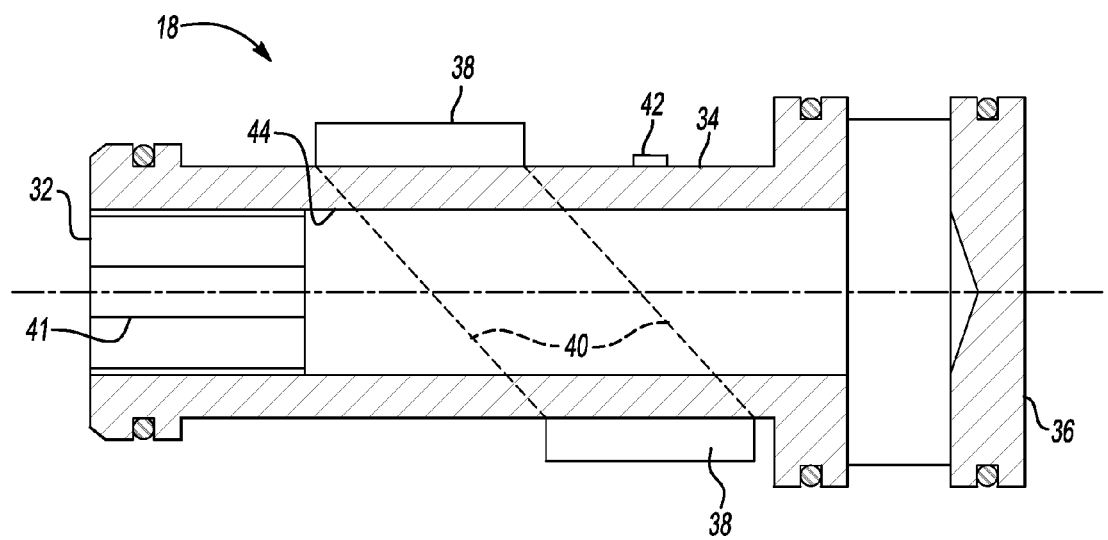
FIG. 3 is a cross-sectional view an ultrasonic sensor for measuring flow volume.

FIG. 2 is a side view of the ultrasonic flow sensor 18. Fluid enters the ultrasonic flow sensor 18 at a first end 32 and exits the ultrasonic flow sensor 18 through the sidewall 34 near a second end 36. Piezoelectric crystals 38 are positioned along the ultrasonic flow sensor 18. As shown there are two sets of piezoelectric crystals 38 placed at 90-degree intervals on the sidewall 34 of the ultrasonic flow sensor 18. Two of the piezoelectric crystals 38, for redundancy, generate a sound wave, while the other two piezoelectric crystals 38 receive the sound wave. By analyzing the sound wave signals received by the piezoelectric crystals 38 the velocity and the volumetric flow rate of fluid through the ultrasonic flow sensor 18 can be calculated. The piezoelectric crystals 38 create two direct sonic flow paths 40 through the ultrasonic flow sensor 18. One of the flow paths 40 is shown in FIG. 3. Alternately, the piezoelectric crystals 38 may be arranged to have a reflective flow path.

Figure 4:
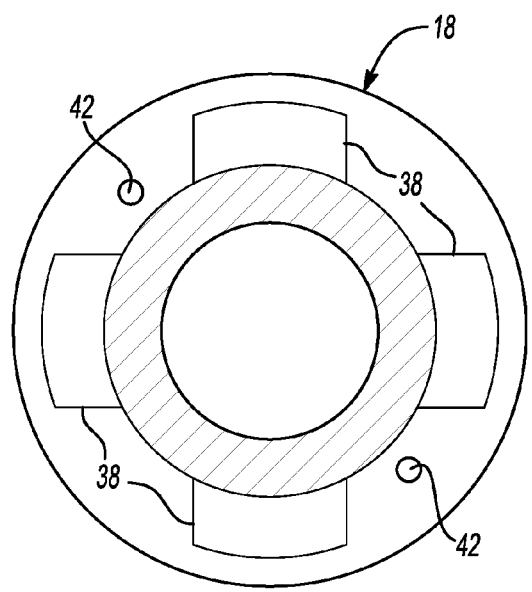
FIG. 4 is an end view an ultrasonic sensor for measuring flow volume showing the location of the temperature sensors and piezoelectric crystals.

Referring to FIG. 3 the ultrasonic flow sensor 18 may utilize a flow straightening device, such as flow straightening tubes 41. At least one temperature sensor 42 is also placed on the ultrasonic flow sensor 18. The temperature sensor 42 is preferably a resistance temperature device (RTD). Other types of temperature sensors are known and may also be used. In the embodiment shown there are two temperature sensors 42, for redundancy (shown in FIG. 4). The temperature recorded by the temperature sensor 42 is used to correct for any thermal expansion of an inner diameter 44 (shown in FIG. 3) of the ultrasonic flow sensor 18 that affects the volumetric flow rate and to calculate the local fuel density based on the slope of the density as determined by a densiometer 30. The temperature can be used to make any necessary adjustments when analyzing the sound wave signals.

Figure 5:
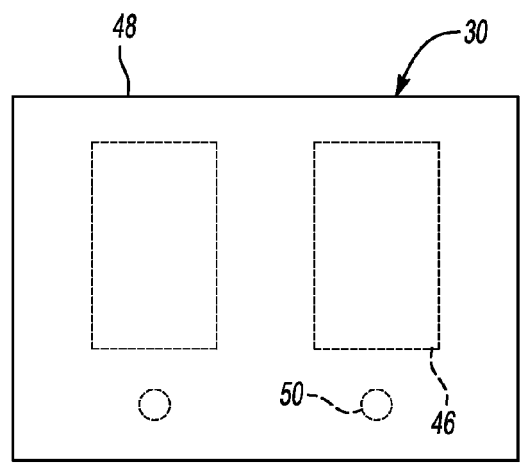
FIG. 5 is a side view of a micro coriolis densiometer.
Figure 6:
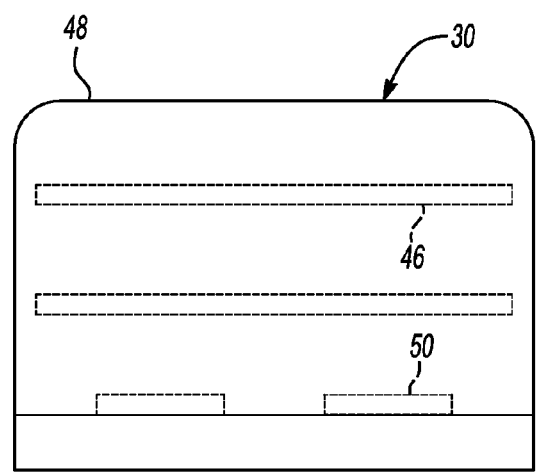
FIG. 6 is an end view of a micro coriolis densiometer.

Referring to FIGS. 5 and 6, a side and end view of a micro coriolis densiometer 30 is shown. The densiometer 30 is a coriolis mass flow sensor 46 etched into a small circuit chip 48. This type of densiometer 30 may be as known. Acceptable densiometers and can be best identified for example by visiting the web page of, Integrated Sensing Systems, at www-.mems-issys.com. The densiometer 30 is ideal for providing instantaneous density readings. As the fuel flows past the densiometer 30 a density of the fuel is determined by the coriolis flow sensor 46. At least one temperature sensor 50 is also located on the computer chip 48. The temperature sensor 50 is used to provide accurate temperature of the fuel to correspond to the fuel density reading. Calibration for the coriolis flow sensor 46 is also embedded on the computer chip 48 so that it may be used in any fuel system without requiring matched sets. Of course, other fluid density meters may be used.

Referring back to FIG. 1, the density and temperature information from the densiometer 30 is sent to an electronic engine controller (EEC) 52. The EEC 52 also receives the volumetric flow and temperature information from the ultrasonic flow sensor 18. Density and temperature for a known material have a linear relationship with one another. Thus, knowing the density of a fluid at one temperature the density at another temperature can be calculated. Using this the EEC 52 can determine the density of the fuel at the ultrasonic flow sensor 18 from the temperature at the ultrasonic flow sensor 18, and the temperature and density at the densiometer 30. By using this relationship to calculate density at the ultrasonic flow sensor 18 the densiometer 30 may be located remotely from the ultrasonic sensor. Preferably, the densiometer 30 is located in a portion of the fuel system 10 that is not subject to high temperatures. The system shown has the densiometer 30 located between the fine fuel filter and a return flow of the fuel to the boost system. Other locations may be desired depending on the design or the application, such as the boost pump circuit of the wing tank.

Using the density calculated at the ultrasonic flow sensor 18 and using the volumetric flow information, an accurate mass flow rate of the fuel at the ultrasonic flow sensor 18 can be calculated. The EEC 52 then sends this information to the aircraft system for the purpose of monitoring instantaneous mass flow and totalized mass flow.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A fuel system for an engine comprising:
a flow metering unit having a density meter;
an ultrasonic volume flow sensor located upstream from at least one fuel nozzle;
a controller in communication with the density meter and the ultrasonic flow sensor and programmed to calculate mass flow to the at least one fuel nozzle;
wherein said volume flow sensor and said density meter each have a temperature sensor for measuring temperature; and
wherein said temperature sensor in said ultrasonic sensor is out of phase with piezoelectric crystals in said ultrasonic sensor.

2. The fuel system of claim 1, wherein said ultrasonic sensor is located immediately upstream of said at least one fuel nozzle.

3. The fuel system of claim 1, wherein density meter is located adjacent a fuel system bypass port.

4. The fuel system of claim 1, wherein said density meter is incorporated into a circuit chip.

* * * * *

UNITED STATES PATENT AND TRADEMARK OFFICE
CERTIFICATE OF CORRECTION

PATENT NO. : 7,600,417 B2
APPLICATION NO. : 11/304273
DATED : October 13, 2009
INVENTOR(S) : Bruce Paradise Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 226 days.

Signed and Sealed this

Fifth Day of October, 2010

David J. Kappos
*Director of the United States Patent and Trademark Office*